(12) United States Patent
Kannan et al.

(10) Patent No.: US 9,847,888 B2
(45) Date of Patent: Dec. 19, 2017

(54) CONTROLLING CONTENT ACCESS AND RELATED ACTIONS ON A DLNA NETWORK

(75) Inventors: Navneeth N. Kannan, Doylestown, PA (US); Samuel H. Reichgott, Coopersburg, PA (US)

(73) Assignee: GOOGLE TECHNOLOGY HOLDINGS LLC, Mountain View, CA (US)

( * ) Notice: Subject to any disclaimer, the term of this patent is extended or adjusted under 35 U.S.C. 154(b) by 0 days.

(21) Appl. No.: 13/219,741

(22) Filed: Aug. 29, 2011

(65) Prior Publication Data
US 2013/0055303 A1 Feb. 28, 2013

(51) Int. Cl.
| | | |
|---|---|---|
| *H04N 21/254* | (2011.01) | |
| *H04L 12/28* | (2006.01) | |
| *H04L 12/24* | (2006.01) | |
| *H04N 21/258* | (2011.01) | |
| *H04N 21/6334* | (2011.01) | |

(Continued)

(52) U.S. Cl.
CPC ...... *H04L 12/2805* (2013.01); *H04L 41/0893* (2013.01); *H04L 63/101* (2013.01); *H04N 21/2541* (2013.01); *H04N 21/25816* (2013.01); *H04N 21/6334* (2013.01); *H04N 21/6582* (2013.01); *H04N 21/8355* (2013.01); *H04L 67/303* (2013.01)

(58) Field of Classification Search
CPC .......... H04N 21/2541; H04N 21/25816; H04L 41/0893; H04L 12/2805; H04L 63/101; H04L 67/303
See application file for complete search history.

(56) References Cited

U.S. PATENT DOCUMENTS 5,973,683 A * 10/1999 Cragun et al. .................. 725/30
7,493,368 B2 2/2009 Raverdy et al.
(Continued)

FOREIGN PATENT DOCUMENTS

WO 2006/108104 A2 10/2006

OTHER PUBLICATIONS

P. Testing, et al., "Forums Archive: Networking: Tp Link TL-WR1043ND v1 review", Whirlpool Discussion Forum, URL: http://forums.whirlpool.net.au/archive/1758036, retrieved Jul. 27, 2012, dated Aug.-Dec. 2011.

(Continued)

*Primary Examiner* — Pinkal R Chokshi
(74) *Attorney, Agent, or Firm* — Young Basile Hanlon & MacFarlane, P.C.

(57) ABSTRACT

A method of controlling ability of a client device to access media content available from a server device on a network is provided. The method includes the steps of receiving with the server device a request from the client device via the network for media content and determining with the server device a type of the client device and a type of the media content. Thereafter, a step of applying a policy stored in software form in the server device for determining actions allowable for the client device with respect to the media content is performed. After the applying step, access of the media content is provided to the client device only to an extent defined and permitted by the policy. A server device for functioning as a Digital Media Server (DMS) on a Digital Living Network Alliance (DLNA) network is also disclosed.

13 Claims, 5 Drawing Sheets

(51) Int. Cl.
*H04N 21/658* (2011.01)
*H04N 21/8355* (2011.01)
*H04L 29/06* (2006.01)
*H04L 29/08* (2006.01)

(56) References Cited

U.S. PATENT DOCUMENTS

| | | | |
|---|---|---|---|
| 7,681,238 B2 | 3/2010 | Plastina et al. | |
| 8,078,665 B2 | 12/2011 | Poder et al. | |
| 8,522,281 B1* | 8/2013 | Sahami et al. | 725/48 |
| 2004/0193906 A1* | 9/2004 | Dar | H04L 29/06 726/13 |
| 2004/0240466 A1* | 12/2004 | Unitt | H04L 12/185 370/461 |
| 2006/0075015 A1 | 4/2006 | Wu et al. | |
| 2006/0137005 A1 | 6/2006 | Park | |
| 2007/0124785 A1* | 5/2007 | Marsico | 725/105 |
| 2007/0157281 A1* | 7/2007 | Ellis | H04N 21/252 725/134 |
| 2008/0066093 A1* | 3/2008 | Igoe et al. | 725/25 |
| 2008/0201731 A1* | 8/2008 | Howcroft | H04N 21/25891 725/13 |
| 2008/0222045 A1* | 9/2008 | Mukerji et al. | 705/59 |
| 2009/0094317 A1 | 4/2009 | Venkitaraman | |
| 2009/0106414 A1 | 4/2009 | Stavenow et al. | |
| 2009/0177971 A1 | 7/2009 | Kim et al. | |
| 2009/0222422 A1 | 9/2009 | Yoon et al. | |
| 2010/0138900 A1 | 6/2010 | Peterka et al. | |
| 2010/0146629 A1 | 6/2010 | Rahman et al. | |
| 2010/0318791 A1 | 12/2010 | Shamsaasef et al. | |
| 2010/0332565 A1 | 12/2010 | Al-Shaykh et al. | |
| 2011/0035786 A1* | 2/2011 | Karaoguz et al. | 726/3 |
| 2011/0078717 A1* | 3/2011 | Drummond | H04N 21/4586 725/14 |
| 2011/0107436 A1 | 5/2011 | Cholas et al. | |
| 2011/0295972 A1* | 12/2011 | Nagatomo | 709/217 |
| 2011/0307595 A1* | 12/2011 | Hwang et al. | 709/223 |

OTHER PUBLICATIONS

TP-LINK Technologies Co.,Ltd "TP-LINK User Guide: TL-WR1043N/TL-WR1043ND Wireless N Gigabit Router, Rev.: 1.0.0", 2009.

PCT Search Report & Written Opinion, Re: Application #PCT/US2012/049305, dated Nov. 28, 2012.

* cited by examiner

CONTROLLING CONTENT ACCESS AND RELATED ACTIONS ON A DLNA NETWORK

FIELD

Media content handling of diverse types of content in a network to which diverse types of electronic devices are connected is described, and more particularly, a system and apparatus that can be used to control, prevent, or permit access of selected digital media content within a Digital Living Network Alliance (DLNA) network are described.

BACKGROUND

The Digital Living Network Alliance (DLNA) guidelines describe a home entertainment protocol permitting seamless sharing of digital media content, such as photographs, music, and video, between many different diverse electronic devices interconnected via a home or other network. The network may be a local area network (LAN) or any other local or remote network on which a DLNA system can function and reside.

DLNA networks utilize standardized interaction between devices such that the devices are interoperable and such that communication between the devices is transparent to the user. For example, Universal Plug and Play (UPnP) is a protocol that enables the discovery and control configuration of other devices in the DLNA network. UPnP uses peer-to-peer network topology where devices discover each other and use a common mechanism which allows exchange of IP packets to communicate their status and abilities to each other.

Accordingly, DLNA and UPnP provide standards for controlling the sharing of media content between electronic devices such as consumer electronic devices (HDTVs, home theater systems, home music systems, set-top boxes, game consoles, digital photo frames, appliances, etc.), computer related devices (desktop computers, laptop computers, cable/Internet modems, home gateways, routers, etc.), and mobile devices (hand-held devices, mobile phones, communication devices, digital cameras, MP3 players, etc.). These standards enable digital media content stored on, or acquired by, one electronic device on the network to be shared by and played on other electronic devices within the home so that a user can access digital media on any of the electronic devices within the home at any location within the home at any time.

Simply for purposes of example, a so-called DLNA "ecosystem" can be constructed of devices from various diverse types of categories, such as Digital Media Server (DMS), Digital Media Player (DMP), Digital Media Renderer (DMR), Digital Media Controller (DMC), Mobile Digital Media Uploader (M-DMU), Mobile Digital Media Downloader (M-DMD) and Media Interoperability Unit (MIU) to name a few. A DMS is a component capable of acquiring, recording, storing and sourcing digital media content (for instance, a set-top box, PC Server, etc.); a DMP is a component capable of finding and acquiring media from a DMS and playing the media (for instance, a high definition television); a DMR has the ability to display content provided to it by another device (i.e., a passive DMP); and a DMC is a component that initiates activities as a third-party controller, for instance, to start a display of media from a DMS to a DMR. A M-DMU is a mobile device that sends content to the server (for instance, a digital camera or camcorder); a M-DMD is a mobile device that receivers content from the server (for instance, a hand held device with a display screen); and a MIU is a component of the DLNA that provides media content format conversions between the various home network devices and mobile devices.

In such a network, many devices may contain various types of content to which other devices may desire access. For the user to access content, the user must be able to browse the objects stored on a DMS, select a specific one, and cause it to be "played" on an appropriate rendering device. A user will typically initiate such operations from a variety of user interface (UI) devices. In most cases, the UI device will either be a UI built into a rendering device or a stand-alone UI device, such as a wireless PDA or tablet. In this case, the user is not required to interact directly with the device (DMS) containing the content.

The Content Directory Service (CDS) provides a uniform standard for UI devices to browse content on a DMS and to obtain detailed information about individual content objects that can be provided by the DMS. Thus, the CDS provides a lookup service that allows clients (devices) to locate individual objects that a DMS is capable of providing. For example, this service can be used to enumerate a list of songs stored on an MP3 player, a list of still-images comprising various slide-shows, a list of movies stored in a DVR, a list of TV shows currently being broadcast, and the like.

Accordingly, within the context of DLNA/UPnP specifications, the DMS (Digital Media Server) acts as a repository for various types of media content and will typically support Content Directory Service (CDS) which is an open standard that specifies the definition, classification and advertisement of such content over the network. These specifications, however, fail to provide any guidance as to when the DMS should exercise control over what content a specific client requesting such information should have visibility over via the CDS and what content should be capable of being accessed by the specific client and to what extent. The reason for this omission is believed to be that the above referenced specifications evolved from a general need to allow plug and play of different media content among different devices in which the ownership of the content and the associated entitlements across the various devices was not considered essential. For instance, user-owned content, in most cases, may be available to the user on any appropriate device.

In contrast, in a typical MVP (Multiple Video Provider) domain, part of the devices in the Customer Premises are not truly retail, and owned by the customer; rather, some devices may be leased to the customer by the MVP. As a typical example, a set-top box or digital recording device acting as a DMS (a server device, or server) may be leased from the service provide or MVP. In addition, the stored content in such server devices may include user-generated and hence user-owned content as well as other content that is provided by the MVP as part of the service or subscription and that is not owned by the user. Typically, content provided by the MVP will be stored in the DMS in an encrypted manner. An example is a DVR recording of a HD movie delivered by the MVP. As another example, live (un-recorded) content available to the DMS or server device via QAM, Internet, or other networking methods may also potentially be made available for retransmission on a home network to a client device.

A need exists for a mechanism or framework that enables the MVP (Multi Video Provider) and/or the user to exercise at least some degree of control over allowing participation and access of content, and furthermore, the extent of the participation and access, of MVP-managed and non-managed devices in the home DLNA network.

SUMMARY

This disclosure describes a method of controlling ability of a client device to access media content available from a server device on a network. The method includes the steps of receiving with the server device a request from the client device via the network for media content and determining with the server device a type of the client device and a type of the media content. Thereafter, the method includes the steps of applying a policy stored in software form in the server device for determining actions allowable for the client device with respect to the media content. After the applying step, the method includes providing access of the media content to the client device only to an extent defined and permitted by the policy.

This disclosure also describes a server device for functioning as a Digital Media Server (DMS) on a Digital Living Network Alliance (DLNA) network. The service device has content filtering software that is loaded and running therein. The content filtering software contains at least one policy for defining actions allowable for client devices requesting actions from the DMS based on a type of the client device making a request and a type of media content being requested. The content filtering software is configured to determine a type of client device requesting information and a type of media content being requested and is configured to determine allowable actions in response to a request based on an application of the policy with respect to the type of client device requesting information and the type of content being requested.

BRIEF DESCRIPTION OF THE DRAWINGS

Various features of the embodiments described in the following detailed description can be more fully appreciated when considered with reference to the accompanying figures, wherein the same numbers refer to the same elements.

DETAILED DESCRIPTION

For simplicity and illustrative purposes, the principles of the embodiments are described by referring mainly to examples thereof. In the following description, numerous specific details are set forth in order to provide a thorough understanding of the embodiments. It will be apparent however, to one of ordinary skill in the art, that the embodiments may be practiced without limitation to these specific details. In some instances, well known methods and structures have not been described in detail so as not to unnecessarily obscure the embodiments.

Figure 1:
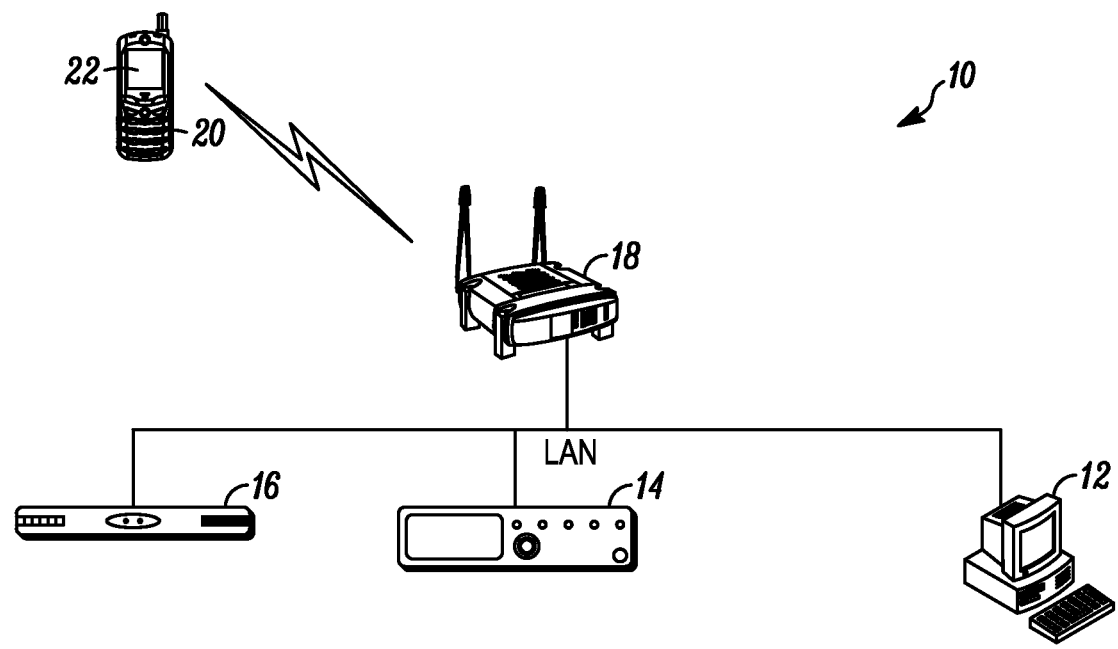
FIG. 1 is an arrangement of one example of a home network in accordance with an embodiment.

FIG. 1 illustrates a simplified local area network (LAN) 10 on which a DLNA system may reside. FIG. 1 is presented merely for purposes of example and not by way of limitation, and it should be understood that many other devices not shown in FIG. 1 can be connected to the network 10, including additional computers, additional set top boxes or televisions with built-in set top boxes, additional wireless hand held devices, and remote networks.

In the illustrated embodiment, the network 10 includes a personal computer 12 providing the function of both a DMS and MIU for the DLNA system. The network 10 also includes an additional electronic device 14 such as a digital video recorder (DVR) functioning as both a DMC and DMS, a set-top box 16 receiving television programming and the like and capable of functioning as both a DMC and DMS, and a wireless router 18 communicating with a battery-operated mobile device 20. The mobile device 20 can be any type of hand-held device (tablet, smart phone, MP3 player, etc.) that may include digital camera capabilities and/or a display screen 22 on which still images and multimedia video can be displayed.

In accordance with DLNA system operations, a consumer can transfer images, videos, audio, music or like content from the mobile device 20 for playback, storage, or viewing on the computer monitor (not shown) associated with the personal computer 12 or a high definition television (not shown) or the like associated with one of the set-top box 16 or digital recording device 14. In this case, the media content is uploaded seamlessly from the mobile device 20 via the router 18 to the DMS/MIU in the personal computer 12. If necessary, the DMS/MIU transforms the media content into a form capable of being played and/or displayed on any of the other electronic devices on the network 10.

Likewise, if source content media is stored on or received by the personal computer 12 via the Internet or the like or the digital recording device 14 or the set-top box 16 via connection to a cable or satellite television network connection, it may be capable of being played on any home electronic device and/or mobile device that is properly connected to the home network 10. For example, a television program received by set-top box 16 via a cable TV connection may provide multimedia content that is encoded by the MIU 12 for being stored on and/or played and viewed on the screen 22 of the mobile device 20.

Any of the devices identified above may come under the classification of a "MVP-managed" server device or client device. A MVP-managed device is a device that is either directly leased to the end user by a MVP (Multi Video Provider) or is a retail device not obtained or leased directly from the MVP but, by virtue of its programming, can be at least monitored and optionally controlled to some degree by the MVP. For purposes of example, the MVP may be a multiple system operator, a television network and/or station, a cable TV operator, a satellite TV operator, a studio, a wireless service provider, an Internet broadcaster/service provider, or like provider that may operate a broadband communication system enabling the delivery of video/audio programs and like multimedia content to consumers over networks or the like via digital or analog signals.

The identity, presence, and relevant client properties of MVP-managed "client" devices on a network may be explicitly made known to a MVP-managed "server" device of the DLNA network through communications with the MVP's management system. Conversely, the identity and presence of a non-managed client device on the network typically cannot be explicitly conveyed to the MVP-managed server device by the MVP; rather, such a non-managed client device must be otherwise discovered via normal operation of the DLNA network. For example, within the DLNA specifications, client devices (non-managed relative to the DMS) do not announce themselves to the DMS devices on the network. Rather, their identity and presence can only be known by the DMS when the client device attempts to perform some action on the DMS, such as browsing CDS content, or attempting to access content. Therefore, for non-managed clients, an implicit discovery mechanism must be employed by the server device (DMS). The network identity and relevant properties that are conveyed within DLNA specified communications may be used (and optionally cached) by a server (DMS) in order to perform content filtering operations which are discussed below.

Client devices that are implicitly discovered by a MVP-managed server device may be made known to the MVP's management system through upstream communications transmitted via the MVP-managed server. At this point, it is possible to set additional properties for the particular client device as directed by the MVP's management system via downstream communications with the MVP-managed server. Furthermore, a client device (including a retail device) that contains MVP-supplied programming (an "app") to control user experience may convey relevant client property information to the MVP-managed server through proprietary methods, outside of DLNA specifications. These may include, for example, user profile information that has been established on a client device by the end user.

Additional client properties may be established locally in the server (DMS) by the end user. For example, the identity of all client devices, whether explicitly or implicitly added to the server's client records, could be presented to the user on the server's user interface (UI). The user in the home could associate each client with a location in the home, a parental control level, or the like. These user-established client properties may be used with a user-established policy, as will be discussed below in greater detail, to further enhance the ability and value of a content filtering feature. Still further, both the MVP and the user may establish default properties to be applied when a client device is implicitly discovered, before such properties are specifically set for the client by either the MVP or the end user. Thus, based on all the possibilities discussed above, a DMS server, such as a MVP-managed server, is able to determine the type of all client devices on the DLNA network as well as the relevant properties of all client devices.

Based on information of the client devices on the network and the type of content capable of being provided by the DMS, in particular a MVP-managed server, a robust framework for an MVP (Multi Video Provider), and/or an end user, to exercise control over allowing content to be accessed and the extent of access of content of MVP-managed and non-managed devices in a network can be provided via content filtering software running on a server device of a DLNA network. Simply for purposes of example, the MVP-managed server device may be a set-top box, a digital video recorder, a computer, a server, or like device capable of functioning as a DMS (Digital Media Server) in a DLNA network. Such a server device may have a computer program or application running therein to provide control and desired "filtering" of access to client devices relative to selected content capable of being provided by the DMS.

In some situations, it may not be desirable to enable the end user, or a secondary end user, to access certain types of content with certain types of client devices on the DLNA network. In this case, it may be desirable for a MVP or primary user (such as a parent or other controller) to exercise control over what content is available to which client device on the network and to what extent. The motivation for exercising control may be based on many different reasons. For example, the reason for control may be that the MVP is leasing a server device to the user and the MVP wants to permit or prevent selected content from being accessed by selected client devices for business purposes. Further, the MVP may want to control a specific user experience for all its leased devices and may potentially do so for retail devices (independent of whether these retail devices are managed by the MVP or not). Still further, the MVP may need to comply with content protection covenants (with content providers) and thus will need to differentiate clients from an entitlement perspective. Of course, these are simply a few examples and there may be many other reasons for control (i.e., for reasons of parental control, user preferences, etc.).

The content filtering software program/application running on the DMS for exercising control of access of content performs a filtering function based on client type and content type information. The application permits "policies" to be created by the MVP, end user, or controller with respect to different client devices, which can be at both a group level of a set of client devices and an individual level for a specific client device. Control of access is typically exercised in terms of the specific client's ability to List, Add, Modify, Delete, Play or Transfer content capable of being provided by the DMS. The software application generates so-called "Allowable-Action-Filter-Vectors" each of which defines access in terms of a client device being able to list, add, modify, delete, play or transfer a specific type of content. This information is derived from a "policy" created in the content filtering software application relative to a specific content item from the CDS. In terms of an equation, an Allowable-Action-Filter-Vector can be represented, as follows:

$$\text{Allowable\_Action\_Filter\_Vector} = f(\text{Client\_Type}, \text{Content\_Type}).$$

A "policy" is the association of an Allowable-Action-Filter-Vector in terms of client type and content type. Such a policy may be established either by the MVP, or by an end user or other controller. In the case of user established policies, these will likely be applied in addition to all MVP-established policies so that, for instance, MVP-established policies cannot be un-done by an end user. Of course, in a non-managed MVP server, all policies may be set by the end user.

As an example of a policy, a given policy may be created in the DMS, such that a human-language version of the given policy can be stated as follows:

"All Clients of products manufactured, sold or leased by 'Company X' that are capable of using DLNA protocol are allowed to List, Add, Modify, Delete, Play and Transfer ALL contents."

Another example of a policy is:

"Any retail client that does not have a MVP provided application running on it, is allowed all operations on the user-generated content, whereas for MVP provided content, it is allowed all the operations only for 'non-high-value content'".

In the above policy example, the MVP may provide both "high-value" content and "non-high-value" content via the MVP-managed server device, and the end user may be prevented from accessing the "high-value" content when using a retail client (device) as a content rendering device as opposed to a MVP-managed client device. Of course, the retail client device in this example is permitted access to render user-generated content and "non-high-value" content available via the MPV-managed server.

The above examples demonstrate that a "policy" may produce different "Allowable-Actions" based on the specific client type in view of the specific content type thereby providing the desired "filtering" feature. The result is a policy 24 provided as a set of Allowable-Action-Vectors 26 as shown schematically in FIG. 2. Accordingly, the application defines "Client Types" 28 and "Content Types" 30 in terms of Match-Rule sets and, if there are 'm' Client Types 28 and 'n' Content Types 30, there will exist "m×n" policy elements which are in the form of "Allowable-Action-Vectors" 26.

Figure 2:
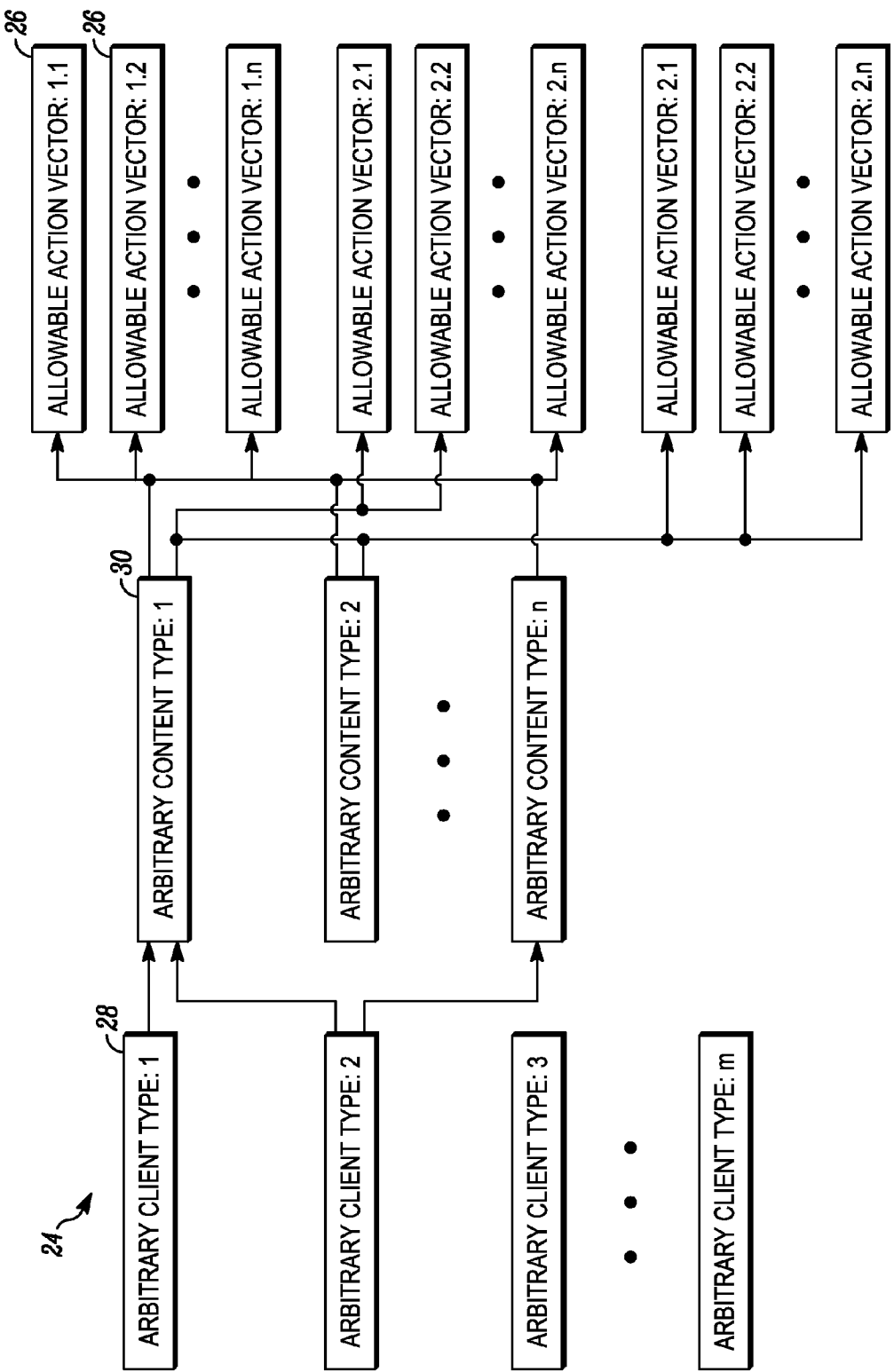
FIG. 2 is an illustrative example of a "policy" depicted as a set of Allowable Action Vectors based on Client Type and Content Type in accordance with an embodiment.
Figure 3:
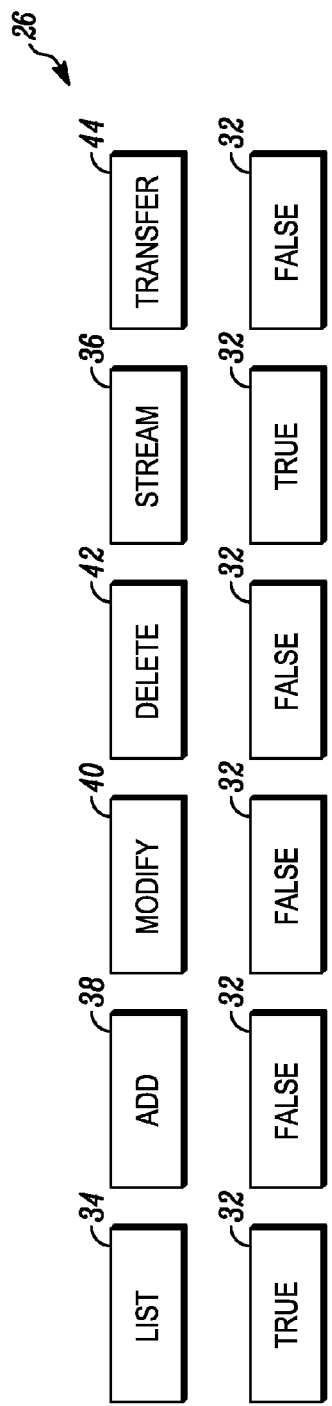
FIG. 3 is an illustrative example of an Allowable Action Vector in accordance with an embodiment.

FIG. 3 illustrates an example of one possible "Allowable-Action-Vector" 26 of FIG. 2. In FIG. 3, the Allowable-Action-Vector 26 is provided by a set of truth values 32 that describes a policy 24 for a specific client device and a specific content combination. Thus, in FIG. 3, the specific client device is permitted to list 34 and stream (play) 36 the specific content; however, the specific client device is not permitted to add 38, modify 40, delete 42 or transfer 44 the specific content.

Furthermore, the above policies may be in terms of arbitrary Client Types and arbitrary Content Types so as to separate the semantics of arriving at a specific Client Type. A correlation may be accomplished by using a set of "interpretive rules". For example, the category "All Company 'X' Set top platforms that are DLNA capable" may be defined as a specific Client Type and this Client Type may be derived from a series of rules thereby avoiding the need to hard-code devices in this category. In this particular case, the rules could be: Vendor ID for the Client indicates Company 'X' and device information indicates QIP-7xxx or QIP-8xxx, as an example. Thus, this rule would cover a set of client devices rather than simply a single identified device.

The rules can be provided as a part of a rule-set that may be generic and that may be based on properties and specific values. Examples are provided in the following rule-set matching example:

1. If <client-property Px><comparison-type><property-value> then (ClientType=1);
2. If <client-property Py><comparison-type><property-value> then (ClientType=2);
3. ...
Where <comparison-type> is one of: "EQUALS", "LESS THAN", "MORE THAN".

This permits the rules to be entered as "Data Objects" and set-up as part of Policy creation. In the same manner, the "Content Type" is arbitrary, and different Content Types can be defined as a set of matching rules. With the above data, the application running on the MVP-managed server permits the determination of Client Type and Content Type using a set of "matching rules". For instance:

Client_Type=f(Raw_Client_Information,Client_Matching_Ruleset); and

Content_Type=f(Raw_Content_Information,Content_Matching_Ruleset).

Figure 4:
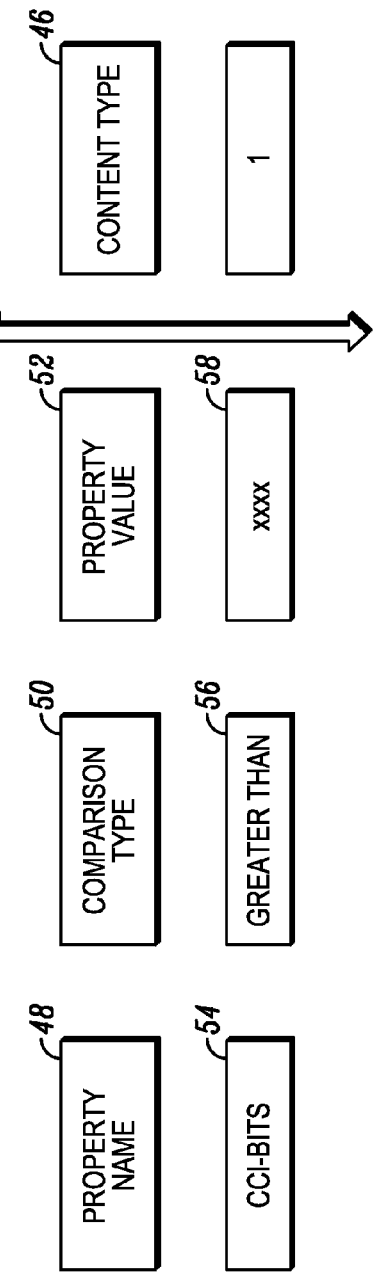
FIG. 4 is an illustrative example of a Content Type definition using a single match rule-set in accordance with an embodiment.

An example of a Content Type definition 46 is provided in FIG. 4. In this example, a definition 46 of a high-value content type is determined by property name 48, comparison type 50, and property value 52. If the property name 48 is "CCI-BITS" 54, the comparison type 50 is "GREATER THAN" 56 and the property value 52 is "XXXX" 58 than Content Type 46 is set equal to one (1).

A more complex match set is also possible for other types in which a sequence of match-set rules is provided. The implementation can either allow for Logical Operations of match-set rules to create rule-sets for deriving the resultant Content Type (or Client Type), or require that simple match-set rules have to be executed in sequence, until a first match.

Figure 5:
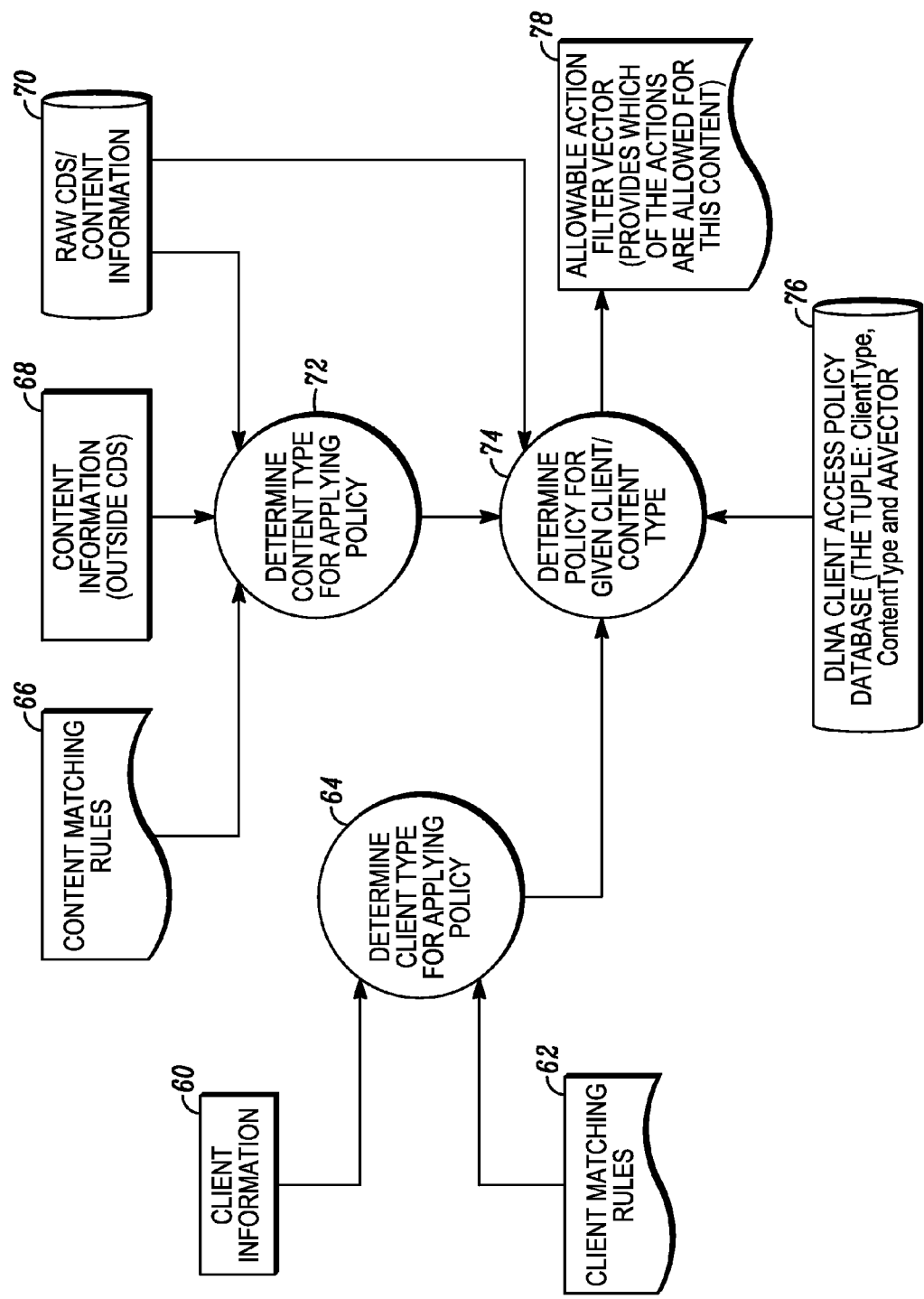
FIG. 5 is a flowchart of content filtering software running on a server device for determining actions allowable for a client device in accordance with an embodiment.

FIG. 5 provides an overview as to the details behind how an Allowable-Action-Vector can be determined for a given Client and Content, by making use of the policy. For instance, client information 60 and/or client matching rules 62 may be considered during step 64 for determining client type for applying a policy. Content matching rules 66, content information (not from CDS) 68, and/or raw CDS content information 70 may be considered during step 72 to determine content type to which a policy should be applied. A policy is determined for a given client type and a given content type at step 74 based on the determined client type from step 64, the determined content type from step 72, the raw CDS content information 70, and a database 76 in which the pre-set DLNA access policies are stored. The policy is then applied in step 78 to obtain the Allowable-Action-Filter-Vector which specifies the actions allowed or not allowed for this combination of client and content.

The above referenced policies may be conveyed to the server device (DMS) via the MVP's management system. For example, the MVP can directly transmit to the DMS an XML file that encodes a policy rule set. In addition, policies may be established by an end user via use of the server's user interface, and may be stored in the server in an appropriate format (e.g. XML). Default policies may be established in server device programming, by the MVP's management system, or by the end user, to address client properties that are undefined at any point in time.

Figure 6:
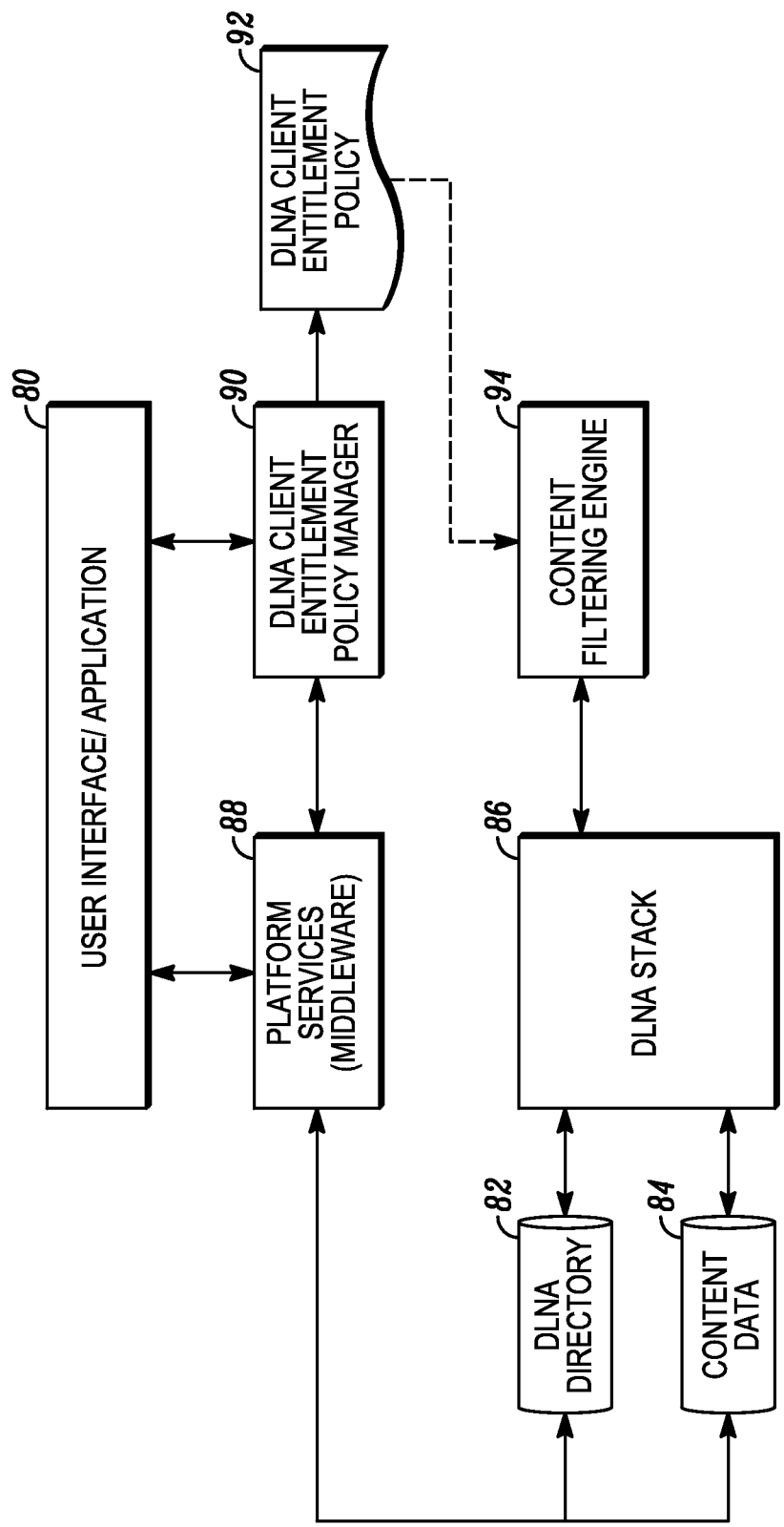
FIG. 6 is a system content diagram of software running on a server device including modules for the content filtering software in accordance with an embodiment.

An example of an arrangement of software modules for a DMS for providing the above referenced filtering feature is shown in FIG. 6. Here, a user interface/application module 80 not only operates in conjunction with a DLNA directory 82, Content Data 84, and DLNA Stack modules 86 via a Platform Services (middleware) module 88, it also operates in conjunction with a DLNA Client Entitlement Policy Manager module 90 which controls the filtering feature. The DLNA Client Entitlement Policy Manager module 90 references a DLNA Client Entitlement Policy program 92 in which the policies are stored and which provides such information to a Content Filtering Engine module 94. With these three additional modules 90, 92 and 94, the software is able to store and apply policies, as discussed above, and then permit or prevent a client device from being able to list, add, modify, delete, stream, or transfer selected content information.

Examples of a few contemplated filtering arrangements are described below.

Example No. 1

In this first example, the MVP may desire that a filtered CDS list of content objects be provided to a set of remote client devices, which are not managed by the MVP, such that the unmanaged remote client device see general content listings, but not any listings of "high-value" content that otherwise could be provided by the MVP-managed server functioning as a DMS on a DLNA network.

In this case, the Allowable-Action for "remote client type"/"High value content" is set to a policy where LIST=FALSE, and the Allowable-Action for "remote client type"/"Normal value content" is set to a policy where LIST=TRUE.

When this policy is applied by the MVP-managed device, the raw CDS content listing of all content is filtered based on the above actions for listing and deriving a filtered CDS list which can be provided to the remote client type of the example. Thus, the MVP-managed server device only transmits the filtered CDS list to the remote client type, and the remote client type will only see a listing of normal-value content when requesting a CDS listing from the MVP-managed server. In contrast, perhaps a different remote client type of device could see and access the full listing. In this manner, the MVP is able to control the user experience and which type of client device can access different types of content.

Example No. 2

Client Enablement Up-Sell

A default policy is established by the MVP stating that "unauthorized client devices may only view promotional content." Thus, when the end user connects a new retail (non-managed) DLNA client device to the home network and attempts to browse content on the MVP-managed server device, the MVP-managed server implicitly discovers the new client device and, since this particular client device does not yet exist in the MVP-managed server's records, the new device is assigned a client property of "unauthorized" by default based on the policy stored in the MVP-managed server device.

The filtering mechanism of the MVP-managed device makes visible a single content item in the CDS listing provided to the new client device. This single content item has the designation of content property "promotional." Thus, the unauthorized client device is able to view this particular item of content.

When played, the "promotional" content explains how the end user can obtain access to additional content through a subscription method. If the user subscribes, the MVP uses its management system to change the "unauthorized" property associated with the retail client device's identity stored in the MVP-managed server device on the DLNA home network to "authorized." This enables additional content to be available to the end user for viewing the next time the user browses the content on the server device from the authorized client.

Example No. 3

Brand Promotion and Revenue Generation

The user may have the opportunity to purchase a client device that is capable of running a MVP-branded "app." The MVP may elect to deploy their "app" on approved devices, with a known level of quality. Alternatively, the MVP may receive a share of proceeds for content that is obtained using their "app" or for sales of the client device. After the MVP-branded "app" is activated on the client device, the client device can communicate with the MVP-managed server device. This establishes a client property of "MVP approved" for this client device, instead of a default "unapproved" property.

The client device that is "MVP approved" is given access to content that is otherwise unavailable to an "unapproved" client device.

This example demonstrates that a client property may be context-dependent. The same client, running a different "app", may not be given access to content that would be available when running the MVP-branded "app".

Example No. 4

End-User Established Policy—Parental Control

The end user (a parent of a child) installs a DLNA-capable game console which will be used by the child. The adult user browses for content on the MVP-managed server, and the game console is implicitly discovered by the MVP-managed server's content filtering software. The server stores the game console's identity in a list of client devices that may be viewed on-screen by the adult user. The adult uses the server's user interface to establish the client property "parentally controlled" for the new client device (game console), and limits the ratings for content that may be viewed on this client device.

In addition to any content filtered by MVP-established policy, the gaming console will thereafter be unable to access content outside of the rating limits established by the adult user.

Example No. 5

Remotely Established End-User Policy—Personal Preferences

Parental control is one example of an end-user established policy. However, other kinds of policies are also possible, especially with MVP-leased client devices. For example, the MVP's client interface may allow users to set up individual user profiles.

For example, as a part of creating a user profile, the user may select content categories of special interest (e.g. sports), or categories that are not interesting (e.g. children's programming) Given an appropriate client-server interface, the user may set policies for personal content filtering on the server, from the remote user interface on the client device.

In accordance with the above description, a DMS, such as a MVP-managed server device, can be provided with content filtering software that determines which type of client device can access which type of content otherwise capable of being provided by the DMS. The reasons or purpose of the filtering can vary as discussed above. However, regardless of the reasoning, a particular client device may be able to access certain content while another client device may be prevented from accessing such content. In addition, the actions permitted by the client device can be controlled with respect to whether or not the client device can list, add, modify, delete, stream or transfer the content.

The devices, modules and storage discussed above can physically be provided on a circuit board or within an electronic device and can include various processors, microprocessors, controllers, chips, disk drives, and the like. It will be apparent to one of ordinary skill in the art that the modules, processors, controllers, units and the like may be implemented as electronic components, software, hardware or a combination of hardware and software.

While the principles of the invention have been described above in connection with specific devices, systems, and methods, it is to be clearly understood that this description is made only by way of example and not as limitation on the scope of the invention as defined in the appended claims.

We claim:

1. A method for controlling access to media content provided by a service provider to a server device on a network, the method comprising:
    receiving, by the server device, a request to perform a specific action with respect to a specific media content from a client device via the network;
    determining, by the server device, a type of the specific media content;
    determining, by the server device, a type of the client device, wherein the determining the type of the client device comprises determining whether the client device is managed by the service provider based at least in part on whether identity information relating to the client device is received by the server device from a management device of the service provider, wherein receiving the identity information by the server device from the management device indicates the client device is managed by the service provider;
    determining, by the server device, a policy from a plurality of policies based on the type of the client device and the type of the specific media content, each policy being defined in a respective allowable action filter vector from a plurality of allowable action filter vectors, wherein each respective allowable action filter vector associates a respective type of client device with a respective type of media content, defines a plurality of different actions that are performed on media contents, and, for each of the plurality of different actions, defines whether performance of the different action is permitted or not permitted on media contents of the respective type associated with the respective allowable action filter vector given the respective type of the client device associated with the respective allowable action filter vector;
    applying the policy, by the server device, to the request to perform the specific action with respect to the specific media content; and
    in response to applying the policy, selectively allowing the specific action from the request to be performed with respect to the specific media content by the client device based at least in part on the allowable action filter vector defining the applied policy when the specific action is defined as permitted in the allowable action filter vector.

2. The method of claim 1, wherein the plurality of different actions in each of the allowable action filter vectors comprise at least one of list, add, modify, delete, play, or transfer the specific media content.

3. The method of claim 1, further comprising receiving the policy, by the server device, from a multiple video provider (MVP) via a remote connection with the MVP, wherein the service provider is the MVP.

4. The method of claim 1, further comprising receiving the policy via a user interface device associated with the network.

5. The method of claim 1, wherein the network is a digital network operating in accordance with a defined protocol.

6. The method of claim 5, further comprising configuring the server device to function as a digital media server (DMS) of the digital network.

7. The method of claim 6, wherein the DMS comprises at least one of a leased server device that is leased from a multiple video provider (MVP), a remotely managed server device that is remotely managed by the MVP, or a set top box.

8. The method of claim 6, wherein the request further comprises a request for a listing of the media content available from the server device.

9. The method of claim 8, wherein the listing of the media content is a content directory service (CDS) listing.

10. The method of claim 8, further comprising, in connection with the applying of the policy, transmitting a filtered listing of media content that lists only media content the client device is permitted to access, as defined in the policy, to the client device.

11. The method of claim 1, wherein the type of the client device comprises at least one of a digital media player, a digital media renderer, a digital media controller, a mobile digital media uploader, a mobile digital media downloader, or a media interoperability unit.

12. A server device for controlling access to media content provided by a service provider on a network, the server device comprising:
    a processor executing computer program instructions; and
    a non-transitory computer-readable storage medium storing computer program instructions executable to perform steps comprising:
      receiving a request to perform a specific action with respect to a specific media content from a client device via the network;
      determining a type of the specific media content;
      determining a type of the client device, wherein the determining the type of the client device comprises determining whether the client device is managed by the service provider based at least in part on whether identity information relating to the client device is received by the server device from a management device of the service provider, wherein receiving the identity information by the server device from the management device indicates the client device is managed by the service provider;
      determining a policy from a plurality of policies based on the type of the client device and the type of the specific media content, each policy being defined in a respective allowable action filter vector from a plurality of allowable action filter vectors, wherein each respective allowable action filter vector associates a respective type of client device with a respective type of media content, defines a plurality of different actions that are performed on media contents, and, for each of the plurality of different actions, defines whether performance of the different action is permitted or not permitted on media contents of the respective type associated with the respective allowable action filter vector given the respective type of the client device associated with the respective allowable action filter vector;
      applying the policy, by the server device, to the request for the specific media content; and
      in response to applying the policy, selectively allowing the specific action from the request to be performed with respect to the specific media content by the client device based at least in part on the allowable action filter vector defining the applied policy when the specific action is defined as permitted in the allowable action filter vector.

13. A non-transitory computer-readable storage medium storing computer program instructions for controlling access to media content provided by a service provider on a network, the instructions executable by a processor of a server device to perform steps comprising:

receiving a request to perform a specific action with respect to a specific media content from a client device via the network;

determining a type of the specific media content;

determining a type of the client device, wherein the determining the type of the client device comprises determining whether the client device is managed by the service provider based at least in part on whether identity information relating to the client device is received by the server device from a management device of the service provider, wherein receiving the identity information by the server device from the management device indicates the client device is managed by the service provider;

determining a policy from a plurality of policies based on the type of the client device and the type of the specific media content, each policy being defined in a respective allowable action filter vector from a plurality of allowable action filter vectors, wherein each respective allowable action filter vector associates a respective type of client device with a respective type of media content, defines a plurality of different actions that are performed on media contents, and, for each of the plurality of different actions, defines whether performance of the different action is permitted or not permitted on media contents of the respective type associated with the respective allowable action filter vector given the respective type of the client device associated with the respective allowable action filter vector;

applying the policy, by the server device, to the request for the specific media content; and in response to applying the policy, selectively allowing the specific action form the request to be performed with respect to the specific media content by the client device based at least in part on the allowable action filter vector defining the applied policy when the specific action is defined as permitted in the allowable action filter vector.

* * * * *